(12) United States Patent
Goettker

(10) Patent No.: US 7,753,395 B2
(45) Date of Patent: Jul. 13, 2010

(54) TONGUE ASSEMBLY FOR A TRAILER HAVING AN INTEGRAL HINGE

(76) Inventor: Bernhardt P. Goettker, 14195 Ridge Canyon Rd., Valley Center, CA (US) 92082

( * ) Notice: Subject to any disclaimer, the term of this patent is extended or adjusted under 35 U.S.C. 154(b) by 305 days.

(21) Appl. No.: 11/881,924

(22) Filed: Jul. 30, 2007

(65) Prior Publication Data
US 2009/0033062 A1  Feb. 5, 2009

(51) Int. Cl.
*B60D 1/54* (2006.01)
(52) U.S. Cl. .................. 280/491.3; 280/491.4
(58) Field of Classification Search ............ 280/491.3, 280/491.4, 491.1, 482
See application file for complete search history.

(56) References Cited

U.S. PATENT DOCUMENTS

| | | | |
|---|---|---|---|
| 4,398,742 A | | 8/1983 | Sanders |
| 5,480,180 A | * | 1/1996 | Fuller et al. ............ 280/656 |
| 5,503,423 A | | 4/1996 | Roberts et al. |
| 5,890,617 A | | 4/1999 | Rowland et al. |
| 6,595,540 B1 | | 7/2003 | MacKarvich |
| 6,869,095 B2 | | 3/2005 | Roll et al. |
| 6,957,826 B1 | | 10/2005 | MacKarvich |
| 7,007,967 B2 | | 3/2006 | Goettker |
| 7,021,645 B1 | | 4/2006 | Stettler |
| 7,237,791 B1 | | 7/2007 | Stettler |
| 2003/0127827 A1 | | 7/2003 | Hulsey et al. |
| 2008/0315561 A1 | * | 12/2008 | Anderson et al. ........ 280/491.1 |

* cited by examiner

*Primary Examiner*—Tony H. Winner
(74) *Attorney, Agent, or Firm*—Rodney F. Brown

(57) ABSTRACT

A trailer tongue assembly is provided which has a first section, a second section and a hinge pivotally connecting the first and section sections. The first section has a first end with a cross-sectional configuration and the second section has a second end with a cross-sectional configuration. The hinge has a fixed section, a rotatable section, and a pivot member. The fixed section has a first attachment flange with a cross-sectional configuration corresponding to the cross-sectional configuration of the first end. The rotatable section has a second attachment flange with a cross-sectional configuration corresponding to the cross-sectional configuration of the second end. The pivot member rotatably connects the fixed and rotatable sections and the first attachment flange is fixably attached to the first end while the second attachment flange is fixably attached to the second end.

20 Claims, 5 Drawing Sheets

TONGUE ASSEMBLY FOR A TRAILER HAVING AN INTEGRAL HINGE

TECHNICAL FIELD

The present invention relates generally to trailers which can be coupled to a tow vehicle and, more particularly, to a tongue assembly which is used to couple a trailer to a tow vehicle, wherein the tongue assembly has an integral hinge.

BACKGROUND OF THE INVENTION

Light-weight utility trailers, such as boat trailers and the like, have a tongue assembly and coupler which enable coupling of the trailer to an associated motorized tow vehicle. The rear end of the tongue assembly is typically mounted to the front of the trailer and the coupler is mounted to the front end of the tongue assembly which extends away from the trailer. The coupler is designed to couple with a hitch mounted on the rear of the tow vehicle, such as an automobile, sport utility vehicle, light truck, or the like. The hitch is typically a ball-shaped male member and the coupler is typically a bowl-shaped female member, which is configured to releasably receive the hitch. An actuator may also be housed in the tongue assembly which is designed to actuate the brakes of the trailer in response to braking commands from the tow vehicle.

The coupler and hitch cooperatively enable a user to selectively couple the tow vehicle with the trailer for the purpose of towing the trailer and its contents to a desired location. The coupler and hitch also cooperatively enable a user to selectively uncouple the tow vehicle from the trailer for the purpose of using the tow vehicle for motorized transport independent of the trailer and/or storing the trailer and its contents at a desired location.

It is common for a tongue assembly to extend a substantial length from the front of the trailer, for example, on the order of 1 to 3 feet or more. The extension length provides adequate clearance between the rear of the associated tow vehicle and the front of the trailer and/or the contents of the trailer which may extend beyond the front of the trailer, such as the bow of a boat being carried by the trailer. Although the extension length is relatively small compared to the entire length of the trailer, the extension length is often the difference by which the trailer fits or does not fit into a size-restricted storage location, such as a garage. Accordingly, it is advantageous for a trailer to have a tongue assembly which is selectively displaceable to reduce the extension length so that the trailer can be stored in tight fitting locations.

Representative prior art tongue assemblies are shown in U.S. Pat. No. Des. 320,777 to Goettker, U.S. Pat. No. 7,007,967 to Goettker, and U.S. Pat. No. 5,992,871 to Rowland et al., all of which are incorporated herein by reference. U.S. Pat. Nos. 7,007,967 and 5,992,871 each disclose a sectional tongue assembly for a boat trailer, which has a hinge selectively rotatably connecting rear and front sections of the tongue assembly. When the tongue assembly is in the operational position, the trailer is at its full length with the tongue and associated coupler extended in front of the trailer. When it is desired to transition the tongue assembly from the operational position to the storage position, the front section of the tongue assembly is pivoted about the hinge to reduce the overall length of the trailer.

The present invention recognizes a need for alternate designs of hinged tongue assemblies. Therefore, it is generally an object of the present invention to provide a tongue assembly, which effectively enables a user to reduce the length of the trailer for storage, while maintaining the trailer at full length for operation. More particularly, it is an object of the present invention to provide a tongue assembly which includes an integral hinge to effectively enable a user to reduce the length of the trailer for storage, while maintaining the trailer at full length for operation. It is another object of the present invention to provide a tongue assembly having an integral hinge which resembles a hinge-free tongue assembly in appearance.

These objects and others are accomplished in accordance with the invention described hereafter.

SUMMARY OF THE INVENTION

The present invention is a tongue assembly for a trailer having an integral hinge. The trailer tongue assembly comprises a first section, a second section and a hinge pivotally connecting the first and section sections to one another. In accordance with an embodiment of the invention, the first section has an outside face and a hollow tubular first end with a cross-sectional configuration. The second section similarly has an outside face and a hollow tubular second end with a cross-sectional configuration.

The hinge has a fixed section, a rotatable section, and a pivot member. The fixed section has an outside face and a first attachment flange with a cross-sectional configuration corresponding to the cross-sectional configuration of the first end. The rotatable section similarly has a second attachment flange with a cross-sectional configuration corresponding to the cross-sectional configuration of the second end. The cross-sectional configuration of the first attachment flange likewise preferably corresponds to the cross-sectional configuration of the second attachment flange.

The pivot member rotatably connects the fixed and rotatable sections which are each preferably fabricated from an essentially unitary solid cast material such as steel. The first attachment flange is received into the hollow tubular first end and fixably attached thereto. The second attachment flange is similarly received into the hollow tubular second end and fixably attached thereto. The outside faces of the first, fixed and second sections preferably smoothly transition between one another.

In accordance with one embodiment, the fixed section of the hinge has a top side and a bottom side. The top side is substantially thicker than the bottom side, thereby increasing the load-bearing capability of the top side relative to the bottom side. The pivot member preferably has an enlarged head and the top side has an indent sized in correspondence with the enlarged head to receive the enlarged head therein such that said enlarged head is essentially flush with the outside face of the fixed section. The rotatable section preferably has an enclosed pivot guide to receive and enclose the pivot member within the pivot guide. The fixed section preferably has a rotation stop which engages the rotatable section when the rotatable section is rotationally displaced about the pivot member to a maximum rotation angle.

The first section is preferably attached to a trailer front while the second section is attached to a coupler. Alternatively, the second section is attached to the trailer front while the first section is attached to the coupler.

The present invention will be further understood from the drawings and the following detailed description.

Figure 1:
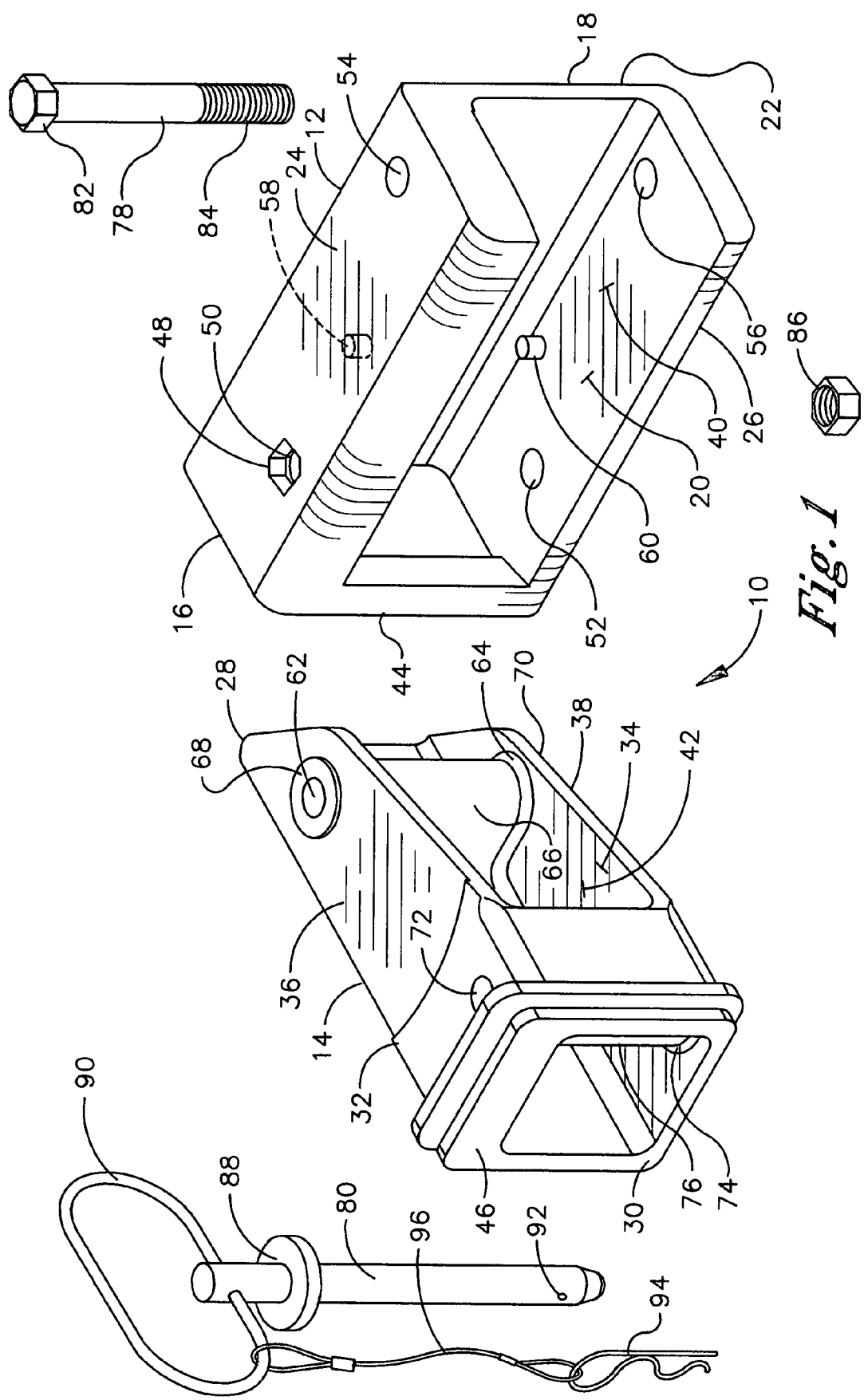
FIG. 1 is a front perspective view of an integral hinge of the present invention in a disassembled state.

Embodiments of the invention are illustrated by way of example and not by way of limitation in the above-recited figures of the drawings, wherein like reference characters indicate the same or similar elements. It should be noted that common references to "an embodiment", "one embodiment", "an alternate embodiment", "a preferred embodiment", or the like herein are not necessarily references to the same embodiment.

DESCRIPTION OF PREFERRED EMBODIMENTS

Figure 2:
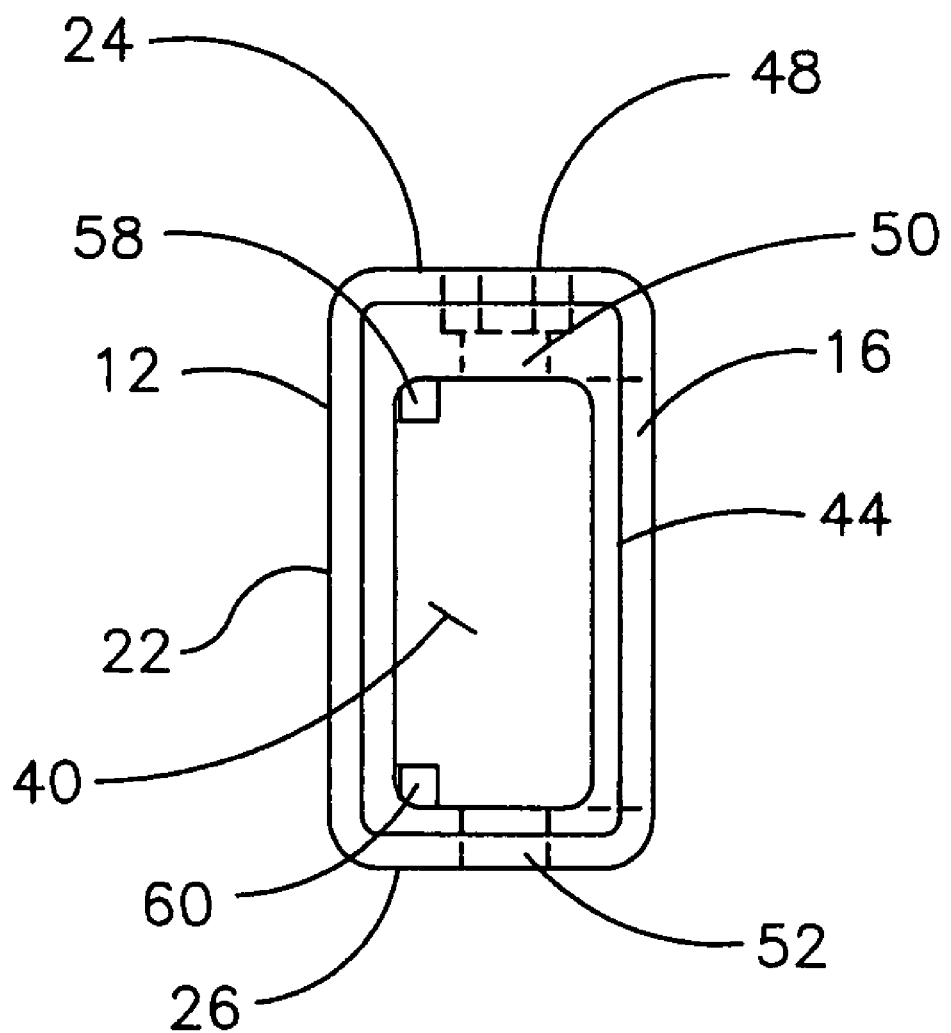
FIG. 2 is a rear perspective view of the fixed section of the integral hinge of FIG. 1.

Referring initially to FIGS. 1 and 2, an embodiment of a hinge of the present invention is shown and generally designated 10. The hinge 10 is constructed for integration into a tongue assembly which is described hereafter. The tongue assembly including the integral hinge 10 is designed for attachment to the front end of a conventional trailer. The tongue assembly including the integral hinge 10 enables one to couple the associated trailer to a motorized tow vehicle and thereafter employ the tow vehicle and trailer for any number of well-known applications. The tongue assembly including the integral hinge 10 has specific utility to light-weight utility trailers, such as boat trailers and the like.

The integral hinge 10 of the present invention has a sectional construction consisting of a fixed section 12 and a rotatable section 14. The terms "fixed" and "rotatable" are used herein to characterize the degree of displacement capability of the above-recited elements with respect to the main body of a trailer when a tongue assembly including the integral hinge 10 is attached to the trailer. A "fixed" element remains stationary at all times relative to the main body of the trailer. A "rotatable" element is rotatably displaceable relative to the main body of the trailer. The terms "front" and "rear" are also used to characterize the relative position of certain elements described hereafter with respect to the main body of a trailer and an associated tow vehicle. A "rear" element is closer to the main body of the trailer and farther from a tow vehicle associated with the trailer. A "front" element is farther from the main body of the trailer and closer to the tow vehicle. The terms "top" and "bottom" are used to characterize the relative position of certain elements described hereafter with respect to the ground surface supporting the trailer and the associated tow vehicle. A "bottom" element is closer to the ground surface. A "top" element is farther from the ground surface.

The fixed section 12 is a three-dimensional construct with a rectangular cross section and six sides. As such, the fixed section 12 has a rear side 16, a front side 18, a first elevational side 20, an opposite second elevational side 22, a top side 24, and a bottom side 26. The rotatable section 14 is likewise a three-dimensional construct having a rear side 28, a front side 30, a first elevational side 32, an opposite second elevational side 34, a top side 36 and a bottom side 38. The rear, front and first elevational sides 16, 18, 20 of the fixed section 12 are essentially open. Conversely, the second elevational, top and bottom sides 22, 24, 26 of the fixed section 12 are essentially enclosed, thereby defining a fixed section interior 40. The enclosed top side 24 of the fixed section 12 is preferably substantially thicker than the enclosed bottom side 26. As such, the top side of the integral hinge 10 has substantially greater structural strength than the bottom side of the integral hinge 10, thereby increasing the load-bearing capability of the top side of the integral hinge 10 relative to the bottom side thereof.

The rear, front and second elevational sides 28, 30, 34 of the rotatable section 14 are essentially open. Conversely, the first elevational, top and bottom sides 32, 36, 38 of the rotatable section 14 are essentially enclosed, thereby defining a rotatable section interior 42. A rear tongue attachment flange 44 is provided on the open rear side 16 of the fixed section 12 and a front tongue attachment flange 46 is provided on the open front side 30 of the rotatable section 14.

An indent 48 is formed in the outside face of the enclosed top side 24 of the fixed section 12 proximal to the rear side 16. A top pivot aperture 50 is formed in the base of the indent 48 and extends through the enclosed top side 24 of the fixed section 12. A bottom pivot aperture 52 is correspondingly formed through the enclosed bottom side 26 of the fixed section 12 which is vertically aligned with the top pivot aperture 50. A top lock aperture 54 is formed through the enclosed top side 24 of the fixed section 12 proximal to the front side 18. A bottom lock aperture 56 is correspondingly formed through the enclosed bottom side 26 of the fixed section 12 which is vertically aligned with the top lock aperture 54. A top rotation stop 58 extends a short distance downward from the inside face of the enclosed top side 24 of the fixed section 12 proximal to the top pivot aperture 50. A bottom rotation stop 60 correspondingly extends a short distance upward from the inside face of the enclosed bottom side 26 of the fixed section 12 proximal to the bottom pivot aperture 52. The bottom rotation stop 60 is vertically aligned with the top rotation stop 58.

A top pivot aperture 62 is formed through the enclosed top side 36 of the rotatable section 14 proximal to the rear side 28. A bottom pivot aperture 64 is correspondingly formed through the enclosed bottom side 38 of the rotatable section 14 which is vertically aligned with the top pivot aperture 62. Both the top and bottom pivot apertures 62, 64 of the rotatable section 14 are also vertically aligned with the top and bottom pivot apertures 50, 52 of the fixed section 12. An enclosed cylindrical pivot guide 66 extends the height of the rotatable section interior 42 between the top and bottom pivot apertures 62, 64.

A top boss 68 is formed on the outside face of the enclosed top side 36 of the rotatable section 14. The top boss 68 rings the top pivot aperture 62 so that the surface of the top boss 68 is raised slightly higher immediately around the top pivot aperture 62 than the substantial remainder of the outside face of the enclosed top side 36. A bottom boss 70 is correspondingly formed on the outside face of the enclosed bottom side 38 of the rotatable section 14. The bottom boss 70 likewise rings the bottom pivot aperture 64 so that the surface of the bottom boss 70 is raised slightly higher immediately around the bottom pivot aperture 64 than the substantial remainder of the outside face of the enclosed bottom side 38.

The height of the rotatable section 14 is defined as the distance between the top and bottom bosses 68, 70 of the rotatable section 14. The height of the fixed section interior 40 is correspondingly defined as the distance between the inside face of the top side 24 of the fixed section 12 and the inside face of the bottom side 26. The height of the rotatable section 14 is at least slightly less than the height of the fixed section interior 40 such that the rotatable section 14, with the exception of the front tongue attachment flange 46, is capable of nesting within the fixed section interior 40 in a manner described hereafter.

A top lock aperture 72 is formed through the enclosed top side 36 of the rotatable section 14 proximal to the front side 30. A bottom lock aperture 74 is correspondingly formed through the enclosed bottom side 38 of the rotatable section 14 which is vertically aligned with the top lock aperture 72. Both the top and bottom lock apertures 72, 74 of the rotatable section 14 are also vertically aligned with the top and bottom lock apertures 54, 56 of the fixed section 12. An enclosed cylindrical lock guide 76 extends the height of the rotatable section interior 42 between the top and bottom lock apertures 72, 74.

In accordance with one embodiment, the fixed section 12 and the rotatable section 14 are each fabricated by casting a high-strength metal to obtain a single solid cast unitary structure in the configuration of the desired section 12 or 14 as described above. A preferred material of fabrication for the fixed and rotatable sections 12, 14 is carbon steel or stainless steel which is capable of being cast into the present structure of the fixed and rotatable sections 12, 14.

The integral hinge 10 further includes a pivot member 78 and a lock member 80. The pivot member 78 is a bolt having a top end with a head 82 and bottom end with a male thread 84. The head 82 of the present embodiment has a hexagon shape. However, the head can be configured in substantially any conventional shape such as a round or button head within the scope of the present invention. The indent 48 in the top side 24 of the fixed section 12 is configured in correspondence with the shape of the head 82. The head 82 is cooperatively sized to fit flush within the indent 48 without passing through the top pivot aperture 50. The bottom end of the pivot member 78 is sized to serially pass through the top pivot aperture 50, the top pivot aperture 62, the pivot guide 66, the bottom pivot aperture 64, and the bottom pivot aperture 52, thereby enabling the male thread 84 to be positioned out the bottom side 26 of the fixed section 12. A female threaded nut 86 is provided to cooperatively receive the male thread 84 of the pivot member 78.

The lock member 80 is a pin having a top end with a collar 88 and a handle 90 and a bottom end with a retention pin bore 92 therethrough which is aligned perpendicular to the longitudinal axis of the lock member 80. The collar 88 is cooperatively sized to prevent the top end of the lock member 80 from passing through the top lock aperture 54. The bottom end of the lock member 80 is sized to serially pass through the top lock aperture 54, the top lock aperture 72, the lock guide 76, the bottom lock aperture 74, and the bottom lock aperture 56, thereby enabling the retention pin bore 92 to be positioned out the bottom side 26 of the fixed section 12. A retention pin 94 is provided which is cooperatively sized to be selectively slidably received within the retention pin bore 92. A retention pin leash 96 loops through the handle 90 and retention pin 94 to prevent the retention pin 94 from being misplaced when the retention pin 94 is not positioned in the retention pin bore 92.

Figure 3:
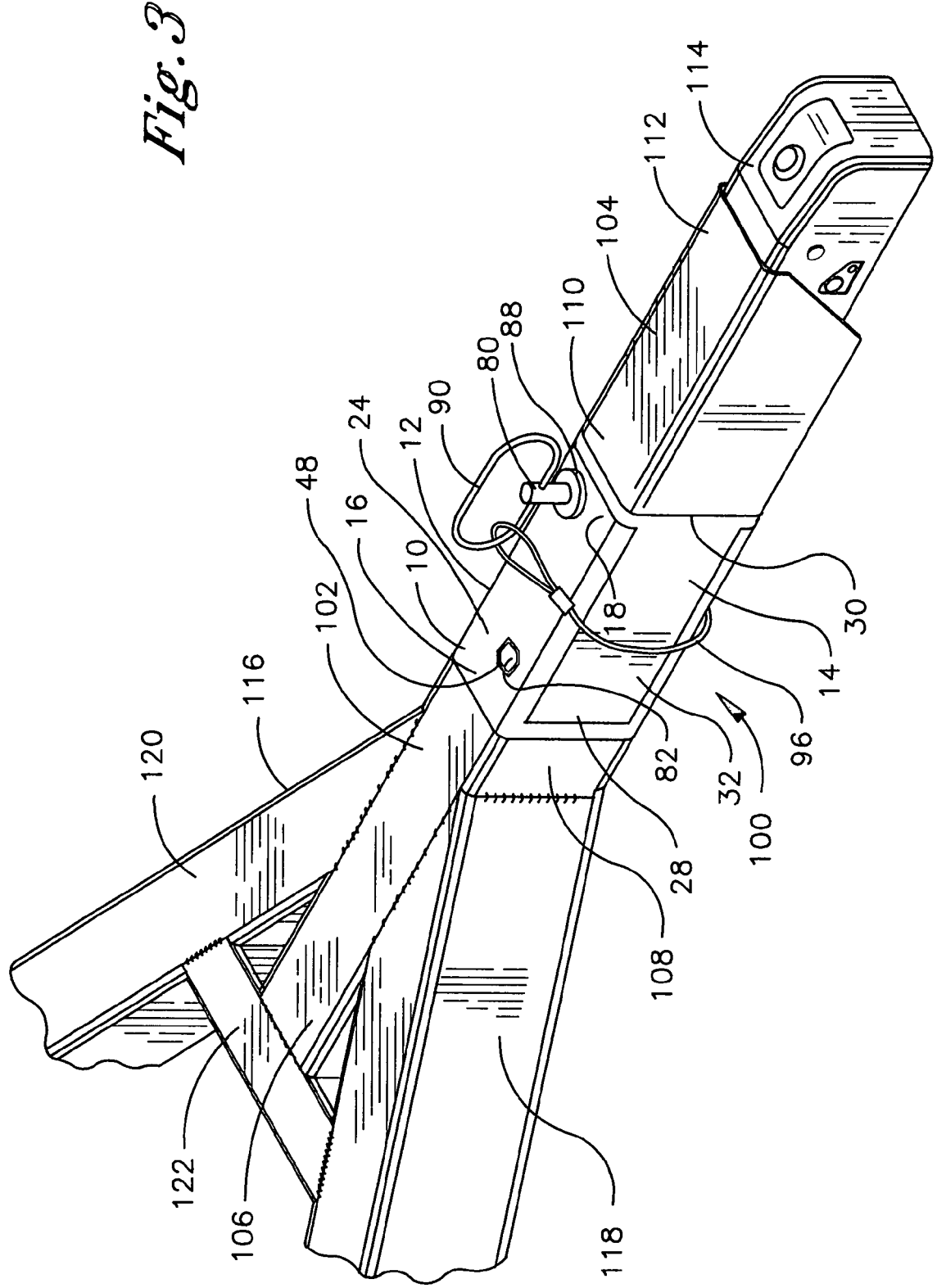
FIG. 3 is a front perspective view of a tongue assembly including the integral hinge of FIG. 1 in an assembled state and configured in a closed operational position.

Referring additionally to FIG. 3, a tongue assembly is shown and generally designated 100 which includes the integral hinge 10 in an assembled state and configured in a closed operational position. The tongue assembly 100 has a sectional construction with a rear section 102 and a front section 104 which are connected to one another by the integral hinge 10. In particular, the rear section 102 has a rear end 106 and a front end 108, wherein the front end 108 is fixably and permanently attached to the rear tongue attachment flange 44 of the fixed section 12 of the integral hinge 10. The front section 104 of the tongue assembly 100 similarly has a rear end 110 and a front end 112, wherein the rear end 110 is fixably and permanently attached to the front tongue attachment flange 46 of the rotatable section 14. Fixable permanent attachment is effected by welding or other such permanent attachment means.

It is noted that the rear and front sections 102, 104 can be selected by the user to have substantially any length as desired when employing the integral hinge 10 in accordance with the present invention. In any case, the rear and front sections 102, 104 of the tongue assembly 100 preferably have a hollow tubular construction formed from a rigid high-strength material such as tubular steel or the like which defines a cross-sectional configuration geometrically and dimensionally corresponding to the cross-sectional configuration of the rear and front tongue attachment flanges 44, 46. In the present embodiment, the cross-sectional configurations of the rear and front sections 102, 104 and the rear and front tongue attachment flanges 44, 46 are all essentially rectangular and correspondingly dimensioned.

The front end 108 of the rear section 102 fits over the rear tongue attachment flange 44 which is received into the interior of the front end 108 and snugly engages the inside walls of the front end 108 to facilitate fixable attachment thereto. The rear end 110 of the front section 104 similarly fits over the front tongue attachment flange 46 which is received into the interior of the rear end 110 and snugly engages the inside walls of the rear end 110 to facilitate fixable attachment thereto. The outside faces of the rear section 102, integral hinge 10 and front section 104 smoothly transition between one another at their common joints, enabling the tongue assembly 100 to appear as an essentially continuous unitary structure when the integral hinge 10 is in the closed operational position.

A coupler 114 is preferably fixably and permanently attached to the front end 112 of the front section 104 of the tongue assembly 100. An actuator (not shown) may also be optionally housed within the front section 104 of the tongue assembly 100.

The rear end 106 of the rear section 102 of the tongue assembly 100 is fixably and permanently attached to a trailer front. A representative trailer front is shown and designated 116. The trailer front 116 has an "A" configuration with a first diagonal support 118, a second diagonal support 120, and a crossbar 122. The crossbar 122 extends between the first and second diagonal supports 118, 120 and is fixably and permanently attached thereto. The first and second diagonal supports 118, 120 converge and are fixably and permanently attached to opposite elevational sides of the rear section 102 forward of the rear end 106. The rear end 106 extends rearward and is fixably and permanently attached to the crossbar 122.

Figure 4:
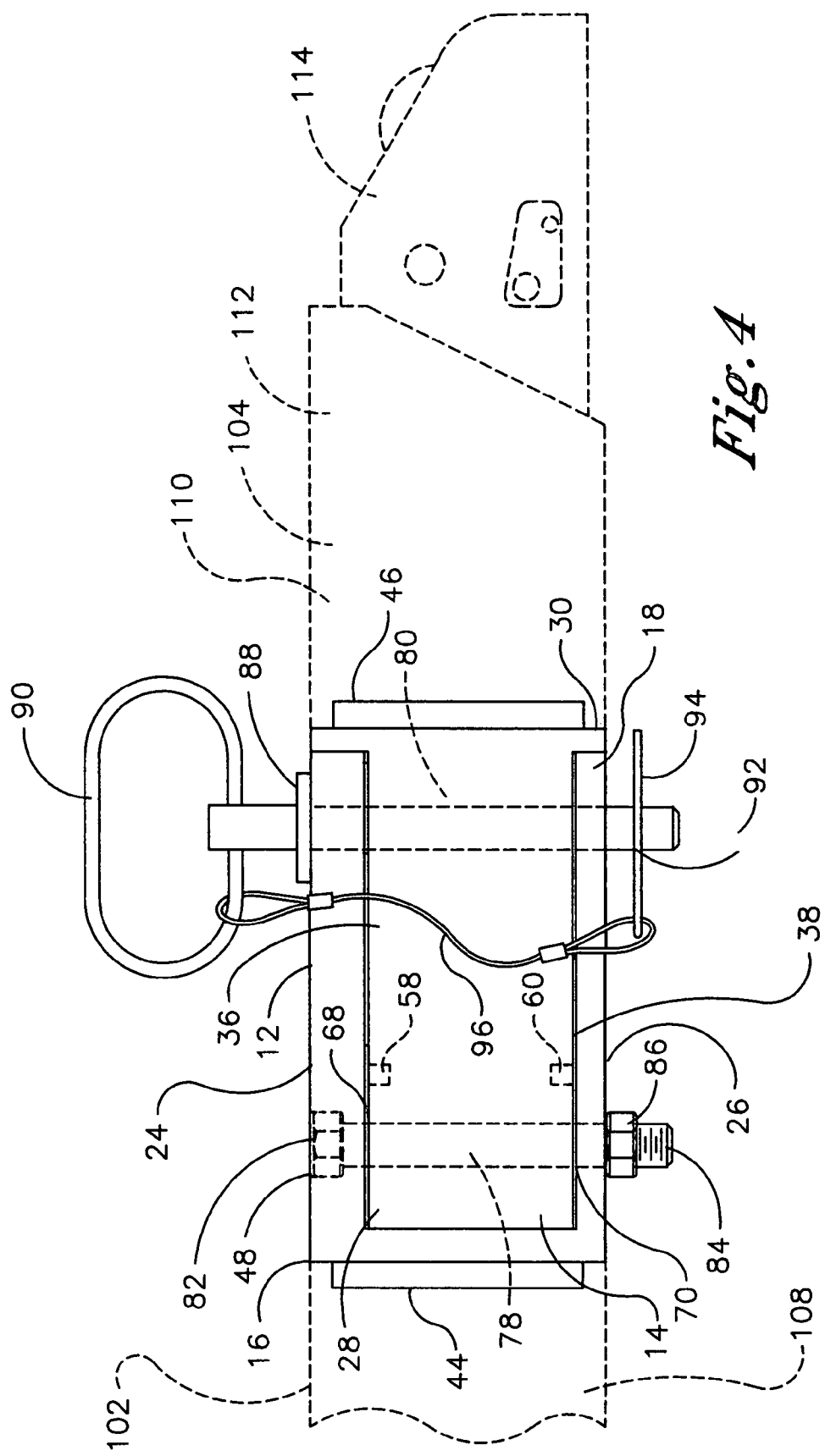
FIG. 4 is a side elevational view of the integral hinge of FIG. 1 in the assembled state and configured in the same closed operational position as FIG. 3.

Referring additionally to FIG. 4, details of the integral hinge 10 are shown when in the assembled state and configured in the closed operational position. In accordance with the closed operational position, the rotatable section 14 is rotatably nested within the fixed section interior 40 with the outside face of the top side 36 of the rotatable section 14 adjacent the inside face of the top side 24 of the fixed section 12 and the outside face of the bottom side 38 of the rotatable section 14 adjacent the inside face of the bottom side 26 of the fixed section 12. As such, the longitudinal axes of the rotatable and fixed sections 12, 14 are in parallel linear alignment with one another when the integral hinge 10 is in the closed operational position.

The head 82 of the pivot member 78 is fitted flush within the indent 48 and the body of the pivot member 78 is positioned in the pivot apertures 50, 52, 62, 64, and pivot guide 66 with the male thread 84 positioned out the bottom side 26 of the fixed section 12. The female threaded nut 86 is tightened onto the male thread 84 of the pivot member 78 to fix the desired position of the pivot member 78.

The enclosed first elevational side of the rotatable section 14 covers the open first elevational side of the fixed section 12 such that the integral hinge 10 is essentially continuously enclosed around its top and bottom sides and first and second elevational sides. The rear and front sides of the integral hinge 10, however, remain open exposing the rotatable section interior 42 via the rear tongue attachment flange 44 and front tongue attachment flange 46, respectively. The flanges 44, 46 and open interior 42 provide a passageway for service lines, such as electrical wiring or hydraulic brake lines, to pass through the length of the integral hinge 10.

The collar 88 of the lock member 80 is positioned against the top side of the fixed section 12 and the body of the lock member 80 is positioned in the lock apertures 54, 56, 72, 74, and lock guide 76 with the retention pin bore 92 positioned out the bottom side 26 of the fixed section 12. The retention pin 94 is pressed into the retention pin bore 92 to fix the desired position of the lock member 80.

Figure 5:
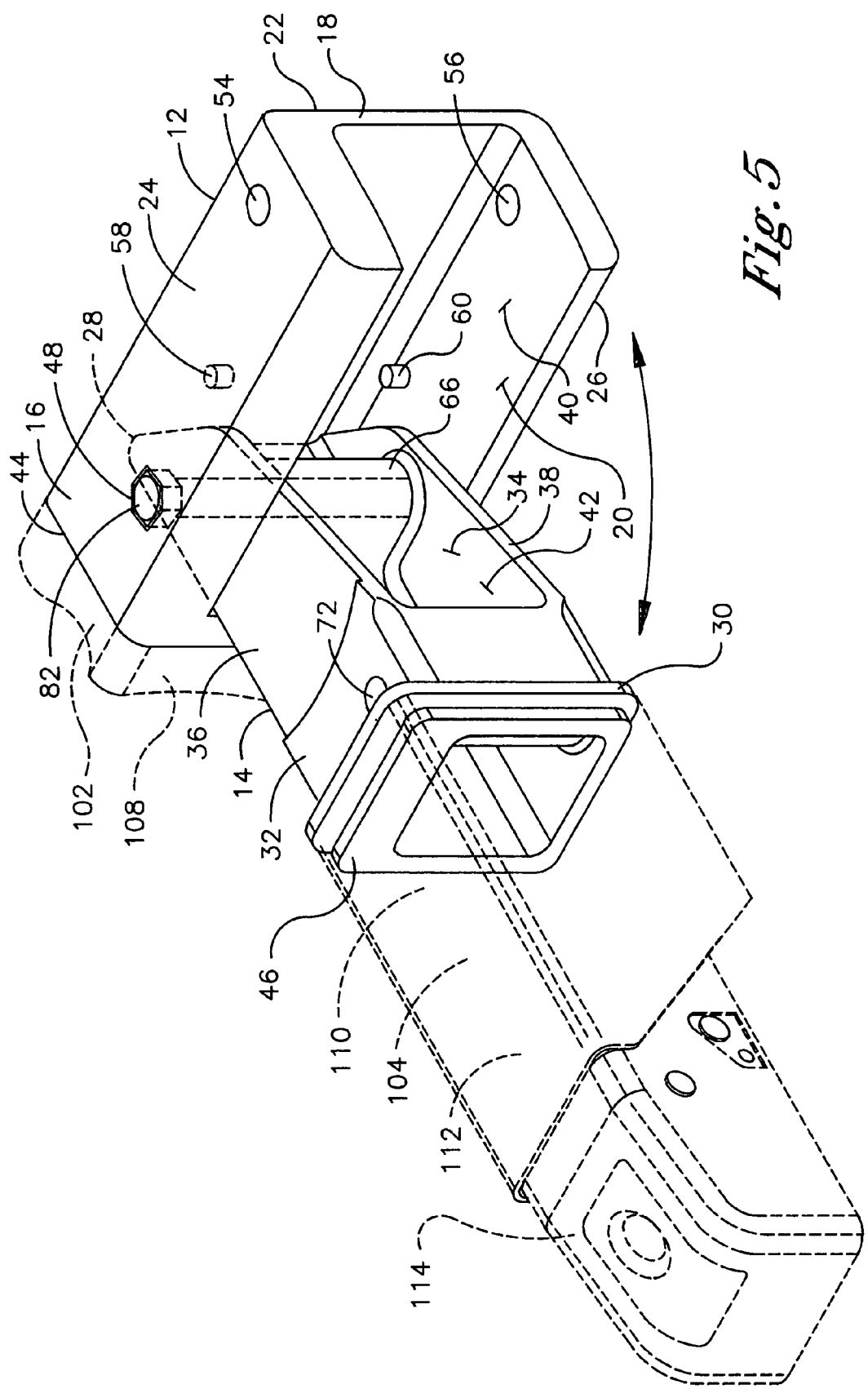
FIG. 5 is a front perspective view of the integral hinge of FIG. 1 in the assembled state and configured in an open storage position.

Referring to FIG. 5, the integral hinge 10 is shown after it has been transitioned from the closed operational position of FIGS. 3 and 4 to an open storage position. Transitioning the integral hinge 10 from the closed operational position to the open storage position is initiated by removing the retention pin 94 from the retention pin bore 92 and manually pulling upward on the handle 90 to withdraw the lock member 80 from the lock apertures 54, 56, 72, 74, and lock guide 76. Withdrawal of the lock member 80 renders the rotatable section 14 freely rotatable about the pivot member 78 relative to the fixed section 12. As noted above, the longitudinal axes of the rotatable and fixed sections 12, 14 are in parallel linear alignment with one another when the integral hinge 10 is in the closed operational position.

Transitioning the integral hinge 10 to the open storage position is completed by rotating the rotatable section 14 about the pivot member 78 so that the fixed section 12 (and correspondingly the attached rear section 102) are no longer in linear alignment with the rotatable section 14 (and correspondingly the attached front section 104). It is further noted that the top and bottom bosses 68, 70 reduce contact and substantial wear between the inside face of the top side 24 of the fixed section 12 and the outside face of the top side 36 of the rotatable section 14 as well as between the inside face of the bottom side 26 of the fixed section 12 and the outside face of the bottom side 38 of the rotatable section 14 when the fixed and rotatable sections 12, 14 are rotated relative to one another. In particular, contact is essentially limited to the bosses 68, 70 and the adjoining area of the outside faces of the top and bottom sides 36, 38 of the rotatable section 14 when the sections 12, 14 are rotated.

When the integral hinge 10 is in the open storage position, the rotatable section 14 (and correspondingly the attached front section 104) is preferably rotationally displaced to a minimum rotation angle of at least about 90 degrees out of linear alignment with the fixed section 12 (and correspondingly the attached rear section 102).

Rotation of the rotatable section 14 (and correspondingly the attached front section 104) beyond a maximum rotation angle (e.g., about 100 degrees) is prevented by the top and bottom rotation stops 58, 60 which engage the rotatable section 14 at or proximal to the rear side 28 when the maximum rotation angle is reached. The maximum rotation angle is selected such that the first elevational side 32 of the rotatable section 14 does not engage the rear side 16 of the fixed section 12 when the rotatable section 14 is rotationally displaced to the maximum rotation angle, thereby preventing abrasion of the fixed and rotatable sections 12, 14 by one another.

The open storage position substantially shortens the length of the tongue assembly 100 from the closed operational position and correspondingly shortens the overall length of the attached trailer for improved storage ability of the trailer when the trailer is disengaged from a tow vehicle and stored at a desired location.

While the forgoing preferred embodiments of the invention have been described and shown, it is understood that alternatives and modifications, such as those suggested and others, may be made thereto and fall within the scope of the invention. For example, it is readily apparent to the skilled artisan that it is within the scope of the present invention to reverse orientation of the integrated hinge 10 relative to the rear and front sections 102, 104 such that the rear tongue attachment flange 44 is fixably and permanently attached to the rear end 110 of the front section 104 and the front tongue attachment flange 46 is fixably and permanently attached to the front end 108 of the rear section 102.

I claim:

1. A trailer tongue assembly comprising:
   a first section having an outside face and a hollow tubular first end with a cross-sectional configuration;
   a second section having an outside face and a hollow tubular second end with a cross-sectional configuration; and
   a hinge having a fixed section having an outside face and a first attachment flange with a cross-sectional configuration corresponding to said cross-sectional configuration of said first end, a rotatable section having a second attachment flange with a cross-sectional configuration corresponding to said cross-sectional configuration of said second end, and a pivot member rotatably connecting said fixed and rotatable sections, wherein said fixed and rotatable sections are each fabricated from an essentially unitary solid cast material and said first attachment flange is received into said hollow tubular first end and fixably attached thereto and said second attachment flange is received into said hollow tubular second end and fixably attached thereto such that said outside faces of said first, fixed and second sections smoothly transition between one another.

2. The trailer tongue assembly of claim 1, wherein said fixed section has a rotation stop engaging said rotatable section when said rotatable section is rotationally displaced about said pivot member to a maximum rotation angle.

3. The trailer tongue assembly of claim 1, wherein said fixed section has a top side and a bottom side, said top side being substantially thicker than said bottom side, thereby increasing the load-bearing capability of said top side relative to said bottom side.

4. The trailer tongue assembly of claim 3, wherein said pivot member has an enlarged head and said top side has an indent sized in correspondence with said enlarged head to receive said enlarged head therein such that said enlarged head is essentially flush with said outside face of said fixed section.

5. The trailer tongue assembly of claim 1, wherein said rotatable section has an enclosed pivot guide to receive and enclose said pivot member within said pivot guide.

6. The trailer tongue assembly of claim 1, wherein said cross-sectional configuration of said first attachment flange corresponds to said cross-sectional configuration of said second attachment flange.

7. The trailer tongue assembly of claim 1, wherein said first section is attached to a trailer front.

8. The trailer tongue assembly of claim 1, wherein said second section is attached to a coupler.

9. The trailer tongue assembly of claim 1, wherein said first section is attached to a coupler.

10. The trailer tongue assembly of claim 1, wherein said second section is attached to trailer front.

11. A trailer tongue assembly comprising:
a first section having a first end with a cross-sectional configuration;
a second section having a second end with a cross-sectional configuration; and
a hinge having a fixed section having a first attachment flange with a cross-sectional configuration corresponding to said cross-sectional configuration of said first end, a rotatable section having a second attachment flange with a cross-sectional configuration corresponding to said cross-sectional configuration of said second end, and a pivot member rotatably connecting said fixed and rotatable sections, wherein said first attachment flange is fixably attached to said first end and said second attachment flange is fixably attached to said second end.

12. The trailer tongue assembly of claim 11, wherein said fixed and rotatable sections are each fabricated from an essentially unitary solid cast material.

13. The trailer tongue assembly of claim 11, wherein said fixed section has a top side and a bottom side, said top side being substantially thicker than said bottom side, thereby increasing the load-bearing capability of said top side relative to said bottom side.

14. The trailer tongue assembly of claim 11, wherein said rotatable section has an enclosed pivot guide to receive and enclose said pivot member within said pivot guide.

15. The trailer tongue assembly of claim 11, wherein said cross-sectional configuration of said first attachment flange corresponds to said cross-sectional configuration of said second attachment flange.

16. The trailer tongue assembly of claim 11, wherein said first section is attached to a trailer front.

17. The trailer tongue assembly of claim 11, wherein said second section is attached to a coupler.

18. The trailer tongue assembly of claim 11, wherein said first section has an outside face, said second section has an outside face and said fixed section has an outside face, further wherein said outside faces of said first, fixed and second sections smoothly transition between one another.

19. The trailer tongue assembly of claim 11, wherein said fixed section has a rotation stop engaging said rotatable section when said rotatable section is rotationally displaced about said pivot member to a maximum rotation angle.

20. A trailer tongue assembly comprising:
a first section having an outside face and a hollow tubular first end with a cross-sectional configuration;
a second section having an outside face and a hollow tubular second end with a cross-sectional configuration; and
a hinge having a fixed section having an outside face and a first attachment flange with a cross-sectional configuration corresponding to said cross-sectional configuration of said first end, a rotatable section having a second attachment flange with a cross-sectional configuration corresponding to said cross-sectional configuration of said second end, and a pivot member rotatably connecting said fixed and rotatable sections, wherein said first attachment flange is received into said hollow tubular first end and fixably attached thereto and said second attachment flange is received into said hollow tubular second end and fixably attached thereto such that said outside faces of said first, fixed and second sections smoothly transition between one another.

\* \* \* \* \*